United States Patent Office 3,167,420
Patented Jan. 26, 1965

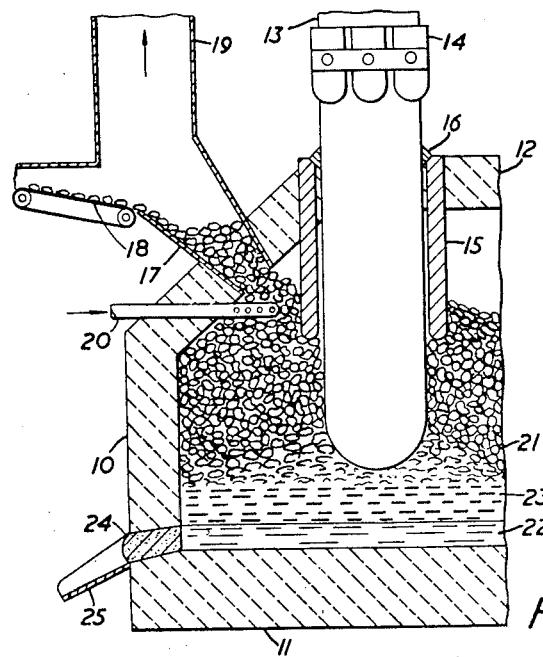
FIG./.
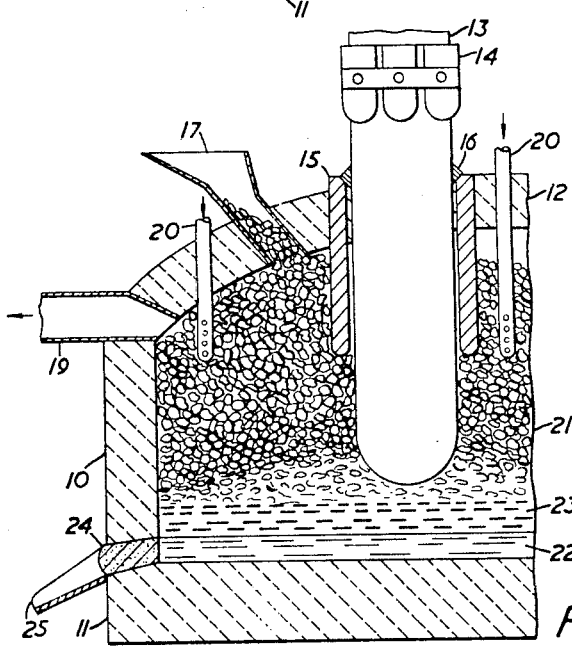
FIG.2.
INVENTOR
ALFRED G. E. ROBIETTE
BY
Watson, Cole, Grindle & Watson
ATTORNEYS

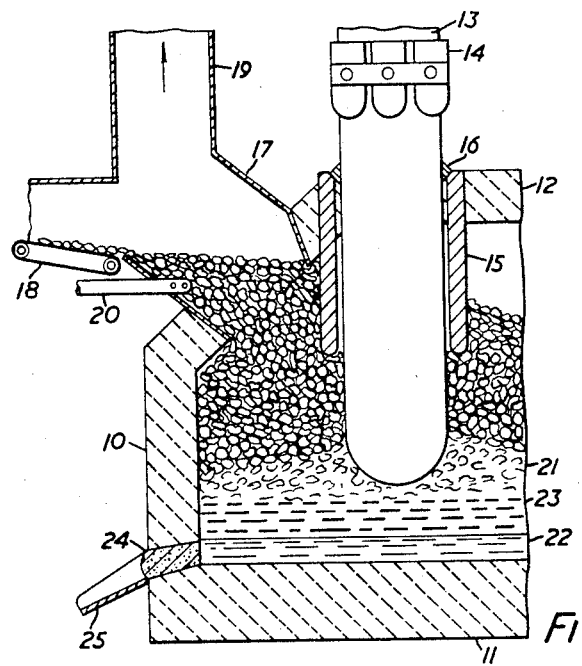
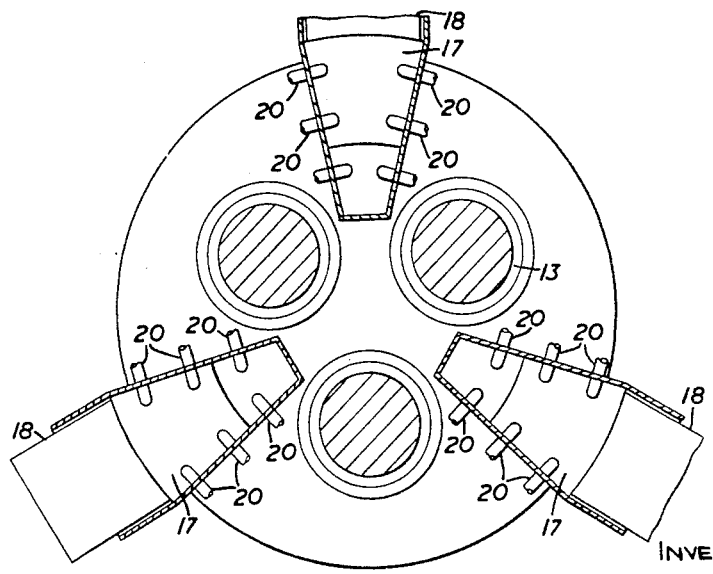

3,167,420
PRODUCTION OF METALS OR ALLOYS
FROM ORES
Alfred Gordon Evans Robiette, Bury Farm,
Bovingdon, Hertfordshire, England
Filed Jan. 22, 1963, Ser. No. 253,139
Claims priority, application Great Britain, Jan. 24, 1962,
2,647/62; Apr. 6, 1962, 13,332/62; June 18, 1962,
23,406/62
12 Claims. (Cl. 75—11)

This invention relates to a process for the production of any metal or alloy from ore or ores capable of being smelted or reduced with carbon in an electric arc furnace, for example the metals iron, tin, zinc, nickel and copper, and the alloys ferro-manganese, ferro-chrome, ferro-silicon, ferro-silicon-aluminium, ferro-silicon-chromium and ferro-silicon-manganese. The invention is also applicable to ores which contain their metals in a so-called "oxidised" form, such as carbonates, silicates and hydroxides or mixtures of these with oxides, and which are normally reduced with carbon.

It is an object of the invention to provide an improved form of such a process in which the final reduction of the ore to the metal or alloy is carried out in an electric arc furnace. A further object is to provide a form of furnace suitable for carrying out the process.

According to one aspect of the invention, in such a process finely divided ore is mixed with finely divided carbonaceous material, the mixture is formed into pellets or briquettes, the pellets or briquettes are introduced into at least one chamber in the region of the upper part of an electric arc furnace in which chamber the pellets or briquettes are preheated and the ore therein is partially reduced in the solid state by heat produced by combustion of at least part of the furnace gas resulting from the final reduction of the ore to liquid metal or alloy in the lower part of the furnace, the carbonaceous material being carbonised in this chamber or in a previous operation, and the preheated carbonised and partially reduced pellets or briquettes are passed from the said chamber into the lower part of the furnace for the final reduction.

In one form of the invention the said chamber is the interior of the upper part of the furnace itself, while in another form of the invention the said chamber is outside but adjacent to the upper part of the furnace; for instance, a charging hopper may constitute the chamber.

The final reduction of the carbon in the lower part of the furnace can be represented generally by the equation

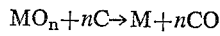

$$MO_n + nC \rightarrow M + nCO$$

wherein M represents the metal or metals concerned. There may also be a small percentage of hydrogen in the furnace gas, derived from a reaction between any moisture introduced with the raw materials and the carbon in the charge.

At least part of the furnace gas produced in the final reduction reaction may be burnt within the said chamber, i.e. in the upper part of the furnace or in the adjacent chamber or chambers, as the case may be, with air introduced from outside, to provide heat for the pre-heating and partial reduction, and in some cases also for carbonising the carbonaceous material in the said chamber. Air from outside may be introduced into the chamber to support the combustion.

In one form of the invention the upper part of the electric furnace is sealed by means of a roof. This permits recovery of the furnace gas and prevents contact of the charge with atmospheric air. For charging the furnace with the pellets or briquettes at least one hopper is provided in the roof. The hopper is sealed into the roof and can be integral with it. If there is a plurality of hoppers these should be so disposed as to give uniform distribution of the charge. In a small furnace one centrally placed hopper may be sufficient, but in large furnaces a plurality of hoppers will give better distribution of the charge. As already indicated, the hopper (or each of them if more than one) may constitute the said chamber or chambers.

The preheating and partial ore reduction, and if desired the carbonisation also, of the pellets or briquettes can be carried out in the charging hopper by allowing the furnace gas to pass upwards through the charging hopper and injecting air through tuyeres in the upper part of the furnace or in the sides of the hopper to burn partially or completely the furnace gas to provide the heat.

The hopper can be of any convenient shape, e.g. circular, rectangular or square in section, or where there are several it may be more convenient to make them of an irregular shape so as to fit in between the electrodes. The hopper may be lined with refractory bricks and provided with a flue or chimney to take off the gases formed in the carbonising of the pellets or briquettes. The hopper, in effect, is a short shaft connecting with the furnace interior so that the preheated pellets or briquettes spill therefrom into the furnace proper without coming into further contact with the outside air.

It has been found that a depth of pellets or briquettes in the hopper of 12 to 18 inches (30 to 46 cm.) is sufficient to give good carbonisation, partial ore reduction and preheating conditions.

The proportion of carbonaceous material initially mixed with the ore is preferably so adjusted that after carbonisation (the effect of which is to strengthen the pellets or briquettes), there will be sufficient residual carbon to complete the reduction of the ore in the lower part of the furnace and to provide any requisite amount of carbon in the resulting metal or alloy. However, if preferred additional carbonaceous material can be charged direct to the furnace. Similarly, additional ore and/or flux may be charged direct to the furnace if desired.

The "green" pellets or briquettes (i.e. the pellets or briquettes in the state in which they are introduced into the chamber) can be produced by grinding the raw materials, for example to a state of fineness such that approximately 25% of the mixture passes a 200 mesh B.S. sieve (0.076 mm. aperture), and then adding sufficient moisture to cause the mixture to aggregate into pellets or briquettes when rolled in a drum or on a saucer-shaped disc. Some ores may require finer grinding. In general, the finer the materials the greater is the strength of the pellet and the more rapid is the subsequent reaction in the smelting furnace. On the other hand, the finer the grinding the more expensive it is, so an economic compromise must be reached as to the minimum degree of grinding and fineness of product which will give adequate strength and sufficiently rapid reaction.

Alternatively, the pellets or briquettes can be formed by pressing the mixture in suitable moulds. It has been found that pellets which have a substantially spherical form are preferable since they are stronger and will withstand more handling than, say, egg-shaped briquettes. After carbonisation they flow more freely and have an angle of rest of 30 to 35 degrees to the horizontal.

The amount of moisture required in the mixture from which the "green" pellets or briquettes are formed will vary considerably, depending upon the nature of the materials and their degree of fineness. In a particular case, a mixture containing a high proportion of very fine, almost colloidal, particles required 6 to 8% water to provide pellets or briquettes which are sufficiently coherent. With some absorbent materials the moisture required may have to be as high as 15%. If the strength of the "green" pellets or briquettes is inadequate using water alone, a binding agent such as bentonite may be used.

If desired, the "green" pellets or briquettes may be further strengthened by drying them at a relatively low temperature of, say, 100 to 200° C.

The "green" pellets or briquettes should be sufficiently strong to enable them to be dropped on to a hard surface from a height of at least three feet (one metre) without breaking.

The carbonaceous material is conveniently a weakly coking to strongly coking coal.

When using certain types of coal, especially those with medium to high coking indices, as the carbanaceous material, some difficulties can arise from the destructive distillation of these coals in the said chamber due to the deposition of tar and other products of the carbonisation process. Such coals are those having a swelling index of between 2 and 9 according to the British Standard specification No. 1,016 or ASTM Designation D720-57 for coking coals. In one form of the present invention in which such a medium to strongly coking coal is used, the coal in a finely divided state is mixed with finely divided oxide ore with or without the addition of finely divided flux, and the mixture is formed into "green" pellet or briquettes which are first subject to a low temperature carbonisation between 500° and 800° C. before being introduced into the said chamber. In the said chamber the already partly carbonised pellets or briquettes are heated to a temperature of between 900 and 1400° C., at least part of the heat being supplied by the combustion of at least part of the gas resulting from the final reduction of the oxide ore to liquid metal or alloy in the lower part of the furnace.

With most oxide ores partial reduction of the oxide will take place when the carbon-containing pellets or briquettes are heated to a temperature of between 900 and 1400° C.

The low temperature carbonisation of the coal in the pellets or briquettes produces a cellular network of coke which contains and holds together the ore, and the flux if present, and the coal used must be such that this carbonised structure is sufficiently strong to withstand the handling required to transport and charge the material to the said chamber where preheating and partial reduction are carried out.

A certain amount of fines, caused by the breaking of the pellets or briquettes, can be tolerated but most of the charge must be in the pellet or briquette form to provide an adequately porous charge in the lower part of the electric furnace.

The low temperature carbonisation can be carried out in a rotary kiln, on a chain grate or by any other convenient means of heating the pellets or briquettes to the stipulated temperatures. To provide the heat for carbonisation an excess of coal can be used and a controlled amount of air introduced to burn part of the coal to provide the heat. Alternatively, external heat in the form of oil or gas or pulverised coal can be used. Preferably, the gas resulting from the low temperature carbonisation is recovered and used to heat the pellets or briquettes. It has been found that with strongly coking coals a carbonisation temperature of between 600 and 700° C. provides a strong pellet or briquette. These pellets or briquettes can be transferred still hot to the said chamber so as to conserve their heat. However, it is usually found that there is sufficient furnace gas to preheat the pellets or briquettes from cold to at least 1200° C. If there should be a surplus of furnace gas some of this can be used for heating the materials for the low temperature carbonisation and the gas and by-products resulting from the carbonisation of the coal can be recovered for other uses.

In a further variation of the invention, if there is a surplus of gas resulting from the low temperature carbonisation, part or all of this gas, preferably after cleaning, is injected and burnt with air in the said chamber so as to pre-heat and partially reduce the charge therein.

According to another aspect of the invention an electric arc smelting furnace suitable for performing the process comprises in the region of an upper part thereof at least one chamber in which pellets or briquettes of ore and carbonaceous material can be preheated and the ore partially reduced and from which the preheated pellets or briquettes can pass into a lower part of the furnace which includes a final reduction zone in which the preheated and partially reduced pellets or briquettes can be finally reduced to metal and slag with the liberation of furnace gas, which gas can pass upwards into the said chamber, and tuyeres for introducing air into the furnace gas to support combustion of the latter to provide heat for the said preheating and partial reduction.

The air to support the combustion of the furnace gas may be enriched with oxygen and may be introduced by means of a series of water-cooled tuyeres distributed around the periphery of the furnace at a level between the lower and upper parts so that a uniform airstream meets the furnace gas emanating from the reduction of the ore in the lower part of the furnace. Other ways of introducing and distributing the air for combustion may be employed. For example, it could be introduced through perforated silicon carbide or heat-resisting alloy tubes. Alternatively, a rotating tubular spider outside the electrode pitch circle could be employed. This would have the additional advantage of breaking up any accretions or aggregations of pellets or briquettes in the case where the said chamber is the interior of the upper part of the furnace itself. In this case, to facilitate the uniform distribution of air into the upper part of the furnace, the cross-section of this part of the furnace can be constricted, e.g. by making this part conical or in the form of a truncated cone. By this expedient, the tuyeres would not have to reach so far into the furnace to provide a uniform air distribution.

The temperature in the upper part of the furnace may be, for example, in the range 800 to 1250° C. To prevent damage to the electrodes and to prevent current passing between the electrodes in this region, the electrodes may be sheathed with refractory material and/or cooled, insulated metallic sleeves.

The carbonisation of the "green" pellets or briquettes in the said chamber produces a gas rich in hydrocarbons and hydrogen, and by closing in the chamber to eliminate partial or complete contact of this gas with outside air, the gas can be recovered and cleaned as a useful combustible gas of high calorific value.

The carbonisation and partial reduction of the pellets or briquettes in the said chamber has several advantages. Firstly, since some reduction of the ore to the metal takes place in this chamber the power requirements to complete the reduction in the lower part of the furnace are less than they would otherwise be. Secondly, loss of heat and the risk of re-oxidation of the partly reduced ore in transferring hot pellets or briquettes from a remote carbonisation chamber to the electric furnace is avoided. Thirdly, both the carbonisation and the main reduction operations can be carried out in one piece of equipment so that the process can be performed with less labour and at lower capital cost than would be the case if the operations were carried out separately.

Some particular forms of apparatus for carrying out the invention will now be described by way of example with reference to the accompanying drawings, in which:

FIGURE 1 is a fragmentary sectional elevation of an electric arc smelting furnace in which the "green" pellets are preheated in a charging hopper and carbonised in the upper part of the furnace;

FIGURE 2 is a fragmentary sectional elevation of a furnace in which the "green" pellets are preheated and carbonised in the upper part of the furnace;

FIGURE 3 is a fragmentary sectional elevation of a furnace in which pellets are preheated and carbonised in a charging hopper; and FIGURE 4 is a plan view of a furnace similar to that shown in FIGURE 3 but with the tuyeres disposed differently.

In the various figures corresponding parts have been given the same reference numerals throughout.

The furnace 10 shown in FIGURE 1 has a refractory lining 11 and a truncated conical roof 12 also lined with refractory material. The furnace has a suitable number of vertical carbon electrodes, three for a three phase supply, of which only one, 13, is shown. A contact clamp 14 feeds current to the electrode. An insulated, water cooled jacket or sleeve 15 surrounds each electrode with a clearance and is sealed at that top by a seal or packing gland 16. The jack or sleeve 15 protects the electrode in the upper part of the furnace and also prevents current flowing between the electrode in this region. Three charging hoppers, only one of which, 17, is shown, are disposed between the electrodes. "Green" pellets are fed into each charging hopper by means of a sealed vibratory feeder 18. A gas take-off or chimney 19 extends upwardly from each hopper. Several perforated tuyeres 20 are spaced around the furnace and so disposed as to provide a substantially uniform stream of air which meets a stream of combustible furnace gas (usually consisting mainly of carbon monoxide and a little hydrogen) which flows upwardly from the smelting zone 21 in the lower part of the furnace in the vicinity of the electrode tips. In the smelting zone 21 semi-molten slag and metal are formed which separate into a pool of molten metal 22 upon which floats a layer of slag 23. A plugged tap hole 24 is provided for running off the metal on removal of the plug. A pouring spout 25 is also provided. The hot products of combustion of the furnace gas with the air introduced through the tuyeres 20 heat the pellets in the upper part of the furnace sufficiently to carbonise the carbonaceous material therein and to reduce partially the ore in the pellets, the final reduction taking place in the smelting zone 21 with the residual carbon in the pellets. The combustion products pass out through the hopper 17, preheating the pellets therein, and then pass through the gas take-off 19 together with the gases produced in the carbonisation and partial reduction of the pellets. The gas from the take-off 19 can be washed and used as a fuel, or if it is not required for this purpose it can be flared off at the mouth of the duct.

In the arrangement shown in FIGURE 2 the tuyeres 20 extend vertically downwards through the upper part of the furnace, and the combustion products of the rising furnace gas and the air introduced through the tuyeres preheat, carbonise and partially reduce the "green" pellets within the upper part of the furnace which may be one or two feet (30 to 60 cm.) deep. The combustion products and the gases produced by carbonisation of the "green" pellets are taken off through a gas-take off 19 which leads direct from the upper part of the furnace and not from the sealed charging hopper 17. The tuyeres 20 consist of a multiplicity of vertical or near vertical tubes projecting downwards through the arched roof 12. These tubes can be spaced at, say, 12 inch (30 cm.) centres and can be of water-cooled metallic construction or of a heat-resisting steel capable of withstanding, say, 1100° C. or of a refractory such as silicon carbide. These tubes can be perforated, as shown, to give uniform air distribution.

In the arrangement shown in FIGURE 3 the tuyeres 20 are located in the base of enlarged charging hoppers 17 just above the furnace roof 12. Each hopper has to have an adequate area to give the necessary carbonisation time which is generally about 10 to about 14 minutes for pellets ½ inch to ¾ inch (12.5 to 20 mm.) diameter. Except for the location of the tuyeres 20 and the shape and form of the charging hopper, the other items in FIGURE 3 are similar to those shown in FIGURE 1.

FIGURE 4 is a plan view of the roof of a modified embodiment showing three electrodes and three V-shaped hoppers with tuyeres at right angles to those in FIGURE 3. The hoppers are disposed so as to feed the pellets into the smelting zone of the furnace, which zone is, in plan view, approximately a circle which encompasses the three electrodes, in a conventional three phase furnace.

A specific example of the process of the invention will now be described. In this example and elsewhere in this specification all parts and percentages are by weight.

*Example*

A coking coal with a swelling index of 8 was ground to sufficient fineness to pass through a 200 mesh B.S. sieve (0.076 mm. aperture) and mixed with chrome ore concentrates and silicon flour as a flux, which were mostly ground to a fineness sufficient to pass through 100 mesh B.S. sieve (0.152 mm. aperture). The proportions of the mixture were:

| | Parts |
|---|---|
| Chrome ore (48% $Cr_2O_3$) | 100 |
| Coal | 30.4 |
| Silica | 14 |

After mixing, 10% of water was added and the materials were rolled in a drum into ¾ inch (20 mm.) diameter pellets. These pellets were fed into a rotary furnace and heated to 650° C. for 22 minutes, and subsequently cooled. By this treatment they would stand a drop of 4 feet (1.2 metres) on to a steel plane without fracture. They were then fed into the charging hoppers of a submerged arc furnace into which air was injected to burn with the furnace gas resulting from the final reduction of the iron and chromium to liquid ferro-chrome. The combustion of the furnace gas preheated the pellets to 1200° C. before they spilled out into the electric furnace.

The pellets before charging to the electric furnace contained only 3.5% volatile matter and all the heavy hydrocarbons, such as tar and naphthalene had been removed.

The power consumption for the production of ferro-chrome was halved as compared with the conventional smelting of lump chrome ores with coke in the electric furnace and the output of the furnace was doubled.

What I claim as my invention and desire to secure by Letters Patent is:

1. A process for the production of a metal from ore in an electric arc furnace having an upper part and a lower part, which comprises mixing finely divided ore with finely divided coal having an ASTM designation D720–57 Free Swelling Index of from 2 to 9, forming said mixture into pellets, subjecting said pellets to heat treatment to carbonize said coal and produce in said pellets a cellular network of coke which contains and holds together said ore, introducing said pellets into at least one chamber in open communication with said lower part of said electric arc furnace, preheating said pellets in said chamber to partially reduce said ore therein in the solid state, passing said preheated pellets containing partially reduced ore into said lower part of said furnace, finally reducing said ore in said pellets to molten metal in said lower part of said furnace with release of furnace gas therefrom, and burning at least part of said furnace gas in said chamber to provide heat for said preheating and partial reduction of said pellets therein.

2. A process according to claim 1 which comprises mixing finely divided flux material with said finely divided ore and said finely divided coal.

3. A process according to claim 1 which comprises carbonizing said coal in said pellets within said chamber simultaneously with said preheating and said partial reduction.

4. A process according to claim 1 which comprises carbonizing said coal in said pellets prior to introducing said pellets into said chamber.

5. A process according to claim 4 in which said heat treatment for carbonizing of said coal is effected at a temperature in the range 500 to 800° C.

6. A process according to claim 1 in which said furnace gas is burnt within said chamber by air introduced from outside said furnace.

7. A process according to claim 1 which comprises selecting the proportion of said coal in said pellets so that there is sufficient residual carbon in said pellets passed into said lower part of said furnace to complete said final reduction of said ore and to provide any requisite amount of carbon in said metal.

8. A process according to claim 1 which comprises forming said mixture into substantially spherical pellets of one half to three quarters of an inch diameter.

9. A process according to claim 1 which comprises incorporating in said mixture sufficient moisture to make said pellets strong enough to be dropped from a height of at least three feet on to a hard surface without breaking.

10. A process according to claim 9 which includes incorporating a binder in said mixture.

11. A process for the production of a metal from ore in an electric arc furnace having an upper part and a lower part, which comprises mixing finely divided ore with finely divided medium to strongly coking coal, forming said mixture into pellets, subjecting said pellets to heat treatment to carbonize said coal and produce in said pellets a cellular network of coke which contains and holds together said ore, introducing said pellets into at least one chamber in open communication with said lower part of said electric arc furnace, preheating said pellets in said chamber to partially reduce said ore therein in the solid state, passing said preheated pellets containing partially reduced ore into said lower part of said furnace, finally reducing said ore in said pellets to molten metal in said lower part of said furnace with release of furnace gas therefrom, and burning at least part of said furnace gas in said chamber to provide heat for said preheating and partial reduction of said pellets therein.

12. A process for the production of a metal from ore in an electric arc furnace having an upper part and a lower part, which comprises mixing finely divided ore with finely divided medium to strongly coking coal, forming said mixture into "green" pellets, subjecting said "green" pellets to heat treatment at a temperature in the range 500 to 800° C. to partially carbonize said coal and form a cellular network of coke which contains and holds together said ore, introducing said heat treated pellets into at least one chamber in open communication with said lower part of said electric arc furnace, further heating said heat treated pellets in said chamber to partially reduce said ore therein in the solid state and further carbonize said coal, passing said further heated and partially reduced pellets into said lower part of said furnace, finally reducing said ore in said pellets to molten metal in said lower part of said furnace with release of furnace gas therefrom, and burning at least part of said furnace gas in said chamber to provide heat for said further heating and partial reduction of said pellets in said chamber.

References Cited by the Examiner

UNITED STATES PATENTS

| 711,738 | 10/02 | Ruthenburg | 75—11 |
| 815,016 | 3/06 | Heroult | 75—11 |
| 1,002,988 | 9/11 | Helfenstein | 75—10 |
| 3,033,673 | 5/62 | Collin | 75—11 |

FOREIGN PATENTS

| 632,355 | 12/61 | Canada. |
| 857,579 | 12/60 | Great Britain. |

DAVID L. RECK, *Primary Examiner.*